(12) United States Patent
Meulendijks et al.

(10) Patent No.: US 9,635,866 B2
(45) Date of Patent: May 2, 2017

(54) MOULDING FOOD PRODUCTS FROM A PUMPABLE FOODSTUFF MASS

(71) Applicant: MAREL TOWNSEND FURTHER PROCESSING B.V., Boxmeer (NL)

(72) Inventors: Johannes Martinus Meulendijks, Deurne (NL); Thomas Willem Dekker, Nijmegen (NL); Martinus Johannes Willebrordus Van Zoelen, 's-Hertogenbosch (NL); Jeroen Robert Willemsen, Veenendaal (NL)

(73) Assignee: MAREL TOWNSEND FURTHER PROCESSING B.V., Boxmeer (NL)

(*) Notice: Subject to any disclaimer, the term of this patent is extended or adjusted under 35 U.S.C. 154(b) by 138 days.

(21) Appl. No.: 14/376,313

(22) PCT Filed: Feb. 1, 2013

(86) PCT No.: PCT/NL2013/050053
§ 371 (c)(1),
(2) Date: Aug. 1, 2014

(87) PCT Pub. No.: WO2013/115647
PCT Pub. Date: Aug. 8, 2013

(65) Prior Publication Data
US 2015/0044335 A1   Feb. 12, 2015

(30) Foreign Application Priority Data

Feb. 3, 2012 (NL) .................................. 2008223
Mar. 29, 2012 (NL) .................................. 2008560

(51) Int. Cl.
*A22C 7/00* (2006.01)
*A47J 43/20* (2006.01)
(Continued)

(52) U.S. Cl.
CPC .......... *A22C 7/0069* (2013.01); *A21C 11/006* (2013.01); *A23L 13/67* (2016.08); *A23P 30/10* (2016.08); *A47J 43/20* (2013.01)

(58) Field of Classification Search
CPC ..................... A23P 1/105; A23P 30/10; A22C 7/0069–7/0076; A22C 7/0092;
(Continued)

(56) References Cited

U.S. PATENT DOCUMENTS 3,137,029 A     6/1964  Zolt
3,689,280 A *   9/1972  Werner .................... A21C 9/04
                                                      425/134

(Continued)

FOREIGN PATENT DOCUMENTS

EP     0 715 814 A1     6/1996
EP     1 262 111 A1    12/2002
(Continued)

*Primary Examiner* — Drew Becker
(74) *Attorney, Agent, or Firm* — Birch, Stewart, Kolasch & Birch, LLP

(57) ABSTRACT

In a method for molding food products from a pumpable foodstuff mass, use is made of a molding device with a mold drum provided with mold cavities having a fill opening for the introduction of foodstuff mass. A mass feed member transfers mass into passing mold cavities. A pump is connected to the inlet of the mass feed member. Product removal takes place downstream of the fill position. The operation of the pump and the rotation of the mold drum are controlled in combination with the design of the mold cavities pattern on the drum and of the mouth of the mass feed member such that in the method all mold cavity filling events during a revolution of the mold drum are performed in sequential order.

10 Claims, 14 Drawing Sheets

(51) Int. Cl.
*A21C 11/00* (2006.01)
*A23P 30/10* (2016.01)
*A23L 13/60* (2016.01)

(58) Field of Classification Search
CPC ............... A23L 1/0073; A23L 1/3177; A23L 13/60–13/67; A21C 11/006; A21C 11/008; A47J 43/20
USPC .......................................... 426/512–513, 646
See application file for complete search history.

(56) References Cited

U.S. PATENT DOCUMENTS

| | | | |
|---|---|---|---|
| 3,887,964 A * | 6/1975 | Richards | A22C 7/0076 425/556 |
| 3,991,440 A * | 11/1976 | Hendrickson, Jr. | A22C 7/0069 425/294 |
| 4,356,595 A | 11/1982 | Sandberg et al. | |
| 4,363,822 A * | 12/1982 | Kleptz | A23B 4/064 264/211.11 |
| 4,761,121 A | 8/1988 | Battista et al. | |
| 5,208,059 A * | 5/1993 | Dubowik | A21C 11/00 426/281 |
| 6,592,359 B2 * | 7/2003 | Kennedy | A22C 7/0084 425/572 |
| 6,811,802 B2 * | 11/2004 | van Esbroeck | A21C 11/00 426/389 |
| 2005/0003062 A1 | 1/2005 | van Esbroeck et al. | |
| 2008/0008799 A1 * | 1/2008 | Zuger | A22C 7/0069 426/389 |
| 2008/0242205 A1 | 10/2008 | Righele | |
| 2010/0086633 A1 * | 4/2010 | Ou-Young | A21C 11/00 425/335 |
| 2012/0003374 A1 * | 1/2012 | Van Der Eerden | A22C 7/0069 426/513 |
| 2012/0015065 A1 * | 1/2012 | Van Der Eerden | A22C 7/0069 425/363 |
| 2012/0177786 A1 * | 7/2012 | Van Der Eerden | A23P 30/10 426/89 |
| 2014/0141135 A1 * | 5/2014 | van Doom | A23P 1/105 426/231 |

FOREIGN PATENT DOCUMENTS

| | | |
|---|---|---|
| GB | 2 052 350 A | 1/1981 |
| NL | 2006841 | 12/2012 |
| WO | WO 00/30458 A1 | 6/2000 |
| WO | WO 2004/002229 A2 | 1/2004 |
| WO | WO 2005/027667 A2 | 3/2005 |
| WO | WO 2005/041697 A2 | 5/2005 |
| WO | WO 2005/107481 A2 | 11/2005 |
| WO | WO 2008/091949 A2 | 7/2008 |
| WO | WO 2010/110655 A1 | 9/2010 |
| WO | WO 2011/005099 A1 | 1/2011 |
| WO | WO 2012/161577 A1 | 11/2012 |

* cited by examiner

MOULDING FOOD PRODUCTS FROM A PUMPABLE FOODSTUFF MASS

FIELD OF THE INVENTION

The present invention relates to a method and installation for moulding food products from a pumpable foodstuff mass. The invention is advantageously employed for the manufacture of meat products from a pumpable ground meat mass, e.g. a ground beef mass, for the manufacture of meat patties.

BACKGROUND OF THE INVENTION

A known method for manufacture of e.g. meat patties involves the use of an installation having a frame and a mould drum with an outer circumferential drum surface and a longitudinal drum rotation axis, often a horizontal axis. The drum is rotatably supported by the frame to revolve about the drum rotation axis. The drum has in the drum surface multiple mould cavities, each having a fill opening for the introduction of foodstuff mass, e.g. ground beef mass, into the mould cavity. A mould drum drive is coupled to the drum to drive the drum in a rotation direction. A mass feed member is stationary arranged at a fill position relative to the drum surface. This mass feed member has a single chamber with an inlet for the foodstuff mass to introduce foodstuff mass into the chamber and with a mouth facing the drum surface that is provided with the mould cavities. The mass feed member is adapted to transfer mass from the chamber into the passing mould cavities of the rotating mould drum when the filling opening of a mould cavity is in communication with the mouth at said fill position. The mass that has been filled into a mould cavity remains in said cavity for a while, commonly the installation has a closure member that extends in downstream direction from the mass feed member at the fill position and temporarily keeps the filled mould cavities closed downstream of the fill position, e.g. to allow the mass to become a more coherent food product. The mass in the mould cavity forms the food product, e.g. the meat patty. The installation comprises a pump that is connected to the inlet of the mass feed member and is adapted to feed foodstuff mass under pressure into the chamber of the mass feed member. A food products release or removal mechanism is provided, e.g. associated with the mould drum, and is adapted to cause or facilitate removal of the food product at a product removal position that is downstream of the fill position. It is for example known to provide air channels in the drum that extend to the cavities and allow to selectively introduce air that has been supplied from a manifold at a head end of the drum via said channels to between the drum and the product in order to facilitate the release thereof from the mould cavity. Other release or removal mechanisms, e.g. using a mechanical ejector, are also known in the art.

The production of moulded food products, e.g. meat patties, with such installations generally includes:
- driving the drum in its rotation direction in a continuous, non-interrupted manner;
- operating the pump so as to feed foodstuff mass to the mass feed member and establish a foodstuff mass pressure in the chamber of said mass feed member,
- transfer of pressurized foodstuff mass via the mouth into each passing mould cavity,
- release of the moulded products from the mould cavities.

Some small capacity prior art moulding devices of the design mentioned above have a drum of minimal axial length that is only provided with a single circumferential array of mould cavities that are arranged at different circumferential positions on the drum surface. An example thereof is shown in U.S. Pat. No. 3,137,029.

It is also known to increase the capacity by lengthening the drum so that the drum has multiple of such groups in axial direction of the drum, or in general to have the mould cavities arranged in the drum surface in a mould cavities pattern with cavities at multiple, e.g. two, or four or more, longitudinal positions when seen in longitudinal direction of the drum and at multiple circumferential positions when seen in circumferential position of the drum.

It is common in prior art mould drums for these installations to arrange the mould cavities in straight or rectilinear rows of multiple mould cavities, said rows being parallel to the drum axis with the rows being offset from one another in circumferential direction. It is also common in such prior art mould drums that all mould cavities are of identical dimensions, e.g. circular contoured cavities, although other embodiments with non-identical cavities are known as well. Examples of known high capacity food product moulding installations and methods are found in e.g. WO 0030458 and WO2004002229.

In general drum type moulding installations allow for a high production capacity compared to well known slide-plate moulding devices, wherein a cyclically driven mould plate with a row of mould cavities is cycled back and forth between a fill position and a release position. At the fill position the row of mould cavities in the reciprocating plate is filled with foodstuff mass. It is common for these plate type devices to fill the mould cavities with foodstuff mass, e.g. ground meat mass, at a high fill pressure, said fill pressure being significantly relieved by suitable operation of the pump in the period when the plate starts to move away from the fill position. This is for example illustrated in U.S. Pat. No. 4,356,595.

In WO 2011005099 the issue of non-uniformity of the finally obtained food products is addressed, e.g. with regard to their appearance and shape. For instance in practical use of a high capacity drum mould device it is observed that in a batch of circular meat patties that are made of ground meat there are visible deviations from the circular contour of the mould cavities. These shape deviations are also non consistent within the batch. In WO 2011005099 it is amongst others proposed to embody each mould cavity with walls so as to define a plurality of moulding cells within each mould cavity in order to alleviate this problem.

Object of the Invention

Whilst measures like the ones proposed in WO 2011005099 enhance moulded food product uniformity, the uniformity problem still remains present, in particular at a high production speed of drum moulding installation. For example stringent demands are placed on meat patties that are supplied to fast food chains, e.g. with regard to shape uniformity.

The present invention aims to provide measures that resolve, or at least reduce, undesirable non-uniformity of the moulded food products that have been obtained with a high capacity drum moulding installation of the type discussed above. The non-uniformity may relate to the shape but also to other aspects of the product, e.g. the composition, such as the density, which may influence other aspects like the later cooking or frying, or the taste in general.

SUMMARY OF THE INVENTION

The present invention achieves the above aim by providing a method for moulding food products from a pumpable foodstuff mass, wherein use is made of a moulding installation for moulding food products from a pumpable foodstuff mass, which installation comprises a frame, a mould drum having an outer circumferential drum surface and a longitudinal drum rotation axis, the drum being rotatably supported by the frame to revolve about the drum rotation axis, wherein the mould drum has in the drum surface multiple mould cavities, each having a fill opening for the introduction of foodstuff mass into the mould cavity, a mould drum drive coupled to the drum to drive the drum in a rotation direction, a mass feed member arranged at a fill position relative to the drum surface, said mass feed member having a single chamber with an inlet for foodstuff mass to introduce said foodstuff mass into the chamber and with a mouth facing said drum surface, said mass feed member being adapted to transfer mass into passing mould cavities of the rotating mould drum when the filling opening of a mould cavity is in communication with the mouth at said fill position, said mass forming a food product in said mould cavity, and a pump connected to the inlet of the mass feed member and adapted to feed foodstuff mass under pressure into the chamber of the mass feed member. Herein the mould cavities are arranged in the drum surface in a mould cavities pattern with cavities at multiple longitudinal positions when seen in longitudinal direction of the drum and at multiple circumferential positions when seen in circumferential position of the drum.

In the inventive method the drum is driven in its rotation direction in a continuous, non-interrupted manner. This is preferably at a constant rotational speed during a revolution of the drum, but one can also envisage a drum drive that causes a periodic variation of the drum rotational speed during a revolution, e.g. increasing the drum speed in an approach period when a cavity to be filled nears the mouth or is already in first communication therewith and slowing down the drum speed when the major portion of the filling event takes place, e.g. when the effective filling opening formed by the overlap of the mouth and the filling opening of the mould cavity is the greatest.

The pump is operated so as to feed foodstuff mass to the mass feed member and establish a foodstuff mass pressure in the chamber of said mass feed member. The pump preferably is a positive displacement pump, e.g. a rotor pump having a rotor with vanes that revolves in a pump chamber having an inlet and an outlet.

The pump may be connected at its inlet to a hopper that is adapted to receive therein a batch of pumpable foodstuff mass, e.g. ground meat. The hopper may be evacuated to reduce the inclusion of air in the mass.

The transfer of pressurized foodstuff mass via the mouth of the mass feed member into each passing mould cavity takes place in a corresponding mould cavity filling event that is defined—with regard to the duration thereof—by the moment of first flow of foodstuff mass into the individual mould cavity and the moment wherein the individual mould cavity has been fully filled and flow of foodstuff mass therein is terminated. Later, e.g. as explained above with reference to the prior art, the release of moulded products from the mould cavities is performed.

In the invention the operation of the pump and the rotation of the mould drum are controlled in combination with the design of the mould cavities pattern on the drum and of the mouth of the mass feed member in such a manner that during the production of moulded food products all mould cavity filling events during a revolution of the mould drum are performed in a sequential order, preferably with a pause between each pair of successive filling events wherein effectively no flow of foodstuff mass out of the mouth takes place.

The invention is based on the insight that uniformity of the food products, in particular of the shape and composition, is greatly enhanced if the actual filling process of all the mould cavities is also highly uniform. To obtain such uniformity of the filling it has been found that this can be achieved if all filling events take place in sequential order, or in other words such that "only one mould cavity is filled at a time". This means that the outflow of foodstuff mass from the chamber of the mass feed member is focussed on one mould cavity only, which outflow stops when the cavity has been filled. It is noted that this moment of the outflow effectively coming to an end is commonly while the filling opening of the mould cavity is still in communication with the mouth. In the practice of manufacturing hamburger meat patties this may e.g. be when about half of the filling opening has passed the mouth of the mass feed member or even earlier. Only then, and possibly and preferably with an intermediate pause (without stopping the drum rotation), does another mould cavity arrive at the filling position such that the mouth and the filling opening of said new cavity come into communication and the outflow of foodstuff mass into this successive one mould cavity starts. As expressed above, this may mean that the mouth still is in communication with the previously filled mould cavity, but as that filling event has been completed there is only the new mould cavity that is effectively filled from the chamber of the mass feed member.

With regard to the pattern of mould cavities this invention excludes the presently most common design of mould drums for high capacity moulding devices, which drums have a pattern of rectilinear rows of mould cavities, which rows are parallel to the drum rotation axis, in combination with a mouth of the mass feed member that is parallel to the rotation axis. This design is excluded as this entails that in each row the multiple mould cavities come into communication with the mouth of the chamber of the mass feed member at the same time and the filling events take place in parallel. With the benefit of the knowledge of the present invention, one will now appreciate that in this arrangement the foodstuff mass will nearly always tend to flow into one cavity of the row first. The immediate result is a pressure drop of the mass in the chamber of the mass feed member, as well as a flow distribution of the mass within the chamber, such that the slightly later starting flows into the other mould cavities of the row are slightly different. These small differences in filling events, which happen very quickly, are now determined to be at the root of the non-uniformity of the food products that are moulded in these high capacity drum moulding installations.

The invention is preferably performed with the mass feed member having a mouth that is embodied as a closed contoured singular straight slot that is arranged parallel to the longitudinal axis of the drum. As indicated above, this is a known embodiment of the mouth for these moulding installations. In this embodiment, the drum may not have rectilinear rows of mould cavities that are parallel to the drum rotation axis, as then multiple filling events would start and take place simultaneously or at least in overlapping manner. Therefore one can envisage that in the method of the invention the mould cavities of a drum are arranged in a pattern of helically extending rows, with one cavity being offset in circumferential direction with regard to the axially neighbouring cavity. It is noted that such an embodiment of the mould drum is disclosed in WO0030458 in combination with a method that envisages a continuous filling of the mould cavities of the drum, so with overlap between the filling events of the mould cavities.

One can also envisage other patterns of the mould cavities than said helically extending rows, e.g. with mould cavities in staggered rows, e.g. at equal axial spacing yet at differing circumferential positions. One can envisage that mould cavities that are to be filled in direct succession are not directly in adjacent axial positions on the drum surface, but are separated further with a mould cavity at an intermediate axial position on the drum surface being filled at a later filling event during the revolution of the drum. All sorts of variations of the pattern are possible within the scope of the inventive method.

As expressed above, a preferred embodiment envisages that there is an actual pause in between successive filling events such that as one filling event is terminated it takes a short while before the next filling event starts. This approach, even though in real terms the pause is very short, effectively guarantees in practice the existence of only one filling event at each moment during the revolution of the drum. The pause can also be advantageously used to allow the pump to make up or restore the pressure within the chamber of the mass feed member, preferably to a predetermined target pressure or target pressure range. This approach allows to avoid the use of a high filling pressure of the mass, which is in particular advantageous for ground meat mass, as a high filling pressure in practice requires the pump to supply mass at a rate well above the average rate wherein mass is filled into the mould cavities. By letting the pump supply mass at a lower rate one can observe in an embodiment of the inventive method that as a consequence of mass flowing into the mould cavity the mass pressure in the chamber drops as the outflow effectively exceeds the inflow. The pause between filling events then allows the pump to restore the mass pressure in the chamber. For example the pump is slowed down or switched off once the pressure of the mass has reached the target pressure or target pressure range during this pause.

It will be appreciated that operation of the pump is a factor in the invention as the rate of supply of foodstuff mass to the mass feed member has significant impact on the outflow of the mass from the mouth and thereby on the duration of each filling event. The invention envisages that in an advantageous situation the pump would be operated at a constant output rate during the revolution of the mould drum as this is beneficial for the lifetime of the pump and may be beneficial for the quality of the pumped mass.

In an embodiment the moulding installation comprises a foodstuff mass pressure sensor that is adapted to sense the actual pressure of the foodstuff mass in the chamber of the mass feed member, preferably the sensor being arranged directly on or in the chamber. The installation comprises a pump control unit that is connected to said foodstuff mass pressure sensor, preferably an electronic control unit. An embodiment of the method comprises selecting a target pressure or target pressure range for the foodstuff mass in the chamber, e.g. based on test runs performed with such foodstuff mass on the device, or based on historical data (e.g. from the manufacturer of the device or other food product manufacturers). In this embodiment it is envisaged that the pump control unit stops or at least slows the pump when the measured foodstuff pressure exceeds the target pressure or the target pressure range and that the pump control unit activates or accelerates the pump when the measured foodstuff pressure drops below the target pressure or target pressure range.

In combination with a pump output such that during a filling event the foodstuff mass pressure in the chamber drops due to outflow into the mould cavity, this approach results in the pump having a periodic variation of the pump output, the frequency per revolution of the drum effectively corresponding to the number of filling events and thus to the number of mould cavities that are filled by the mass feed member to which the pump is connected. In graphical form during a revolution of the drum, the mass pressure in the chamber may show a wave pattern with peaks and valleys at said frequency. In a preferred embodiment for ground meat the pressure amplitude of the mass pressure lies between 0.3 and 1.0 bar, with an average pressure of the mass in the range between 3 and 6 bars.

In an embodiment the invention envisages the use of an installation that is also provided with a pump timing mechanism that causes activation or acceleration of the pump during intervals that take place periodically during a revolution of the mould drum, each of said intervals being in timed relation to a corresponding filling event of a single mould cavity, an interval at least partly being in timed overlap with said single filling event, said activation or acceleration causing a temporary increase of flow of foodstuff mass to the mass feed member during said interval and said flow being relatively reduced in between successive intervals. In a preferred embodiment the timing mechanism determines the actual position of the first to be filled mould cavity relative to the mouth, e.g. by detecting the actual angular position of the drum (and thereby of the mould cavities) during operation of the device. It will be appreciated that such pump timing may be used as an alternative for the pump controlled based on actual mass pressure in the chamber, or can even be combined therewith to obtain a further enhanced control of the pump output and thereby enhanced filling of the mould cavities. With regard to the pump timing mechanism reference is made to applicants non-prepublished and co-pending patent application NL2006841 which is incorporated herein by reference, in particular with respect to the embodiments of the device and method as listed in the claims thereof.

In a practically preferred embodiment of the invention the mass feed member comprises a funnel body that delimits the single chamber for the mass in the mass feed member. The funnel body has main walls of substantially triangular shape that are connected along their sides, with a mouth side thereof formed by a wall containing the mouth and with the inlet to the chamber being arranged at an apex of said main walls that is located opposite said wall containing said mouth. Due to this funnel shape the effective cross section of the chamber increases from the inlet towards the opposite side wall containing the outflow mouth. As is preferred the mass feed member has a single slot mouth that spans the length of the drum surface provided with mould cavities, so that all said cavities pass along said single slot.

It is envisaged that the chamber of the mass feed member is a closed chamber that allows for pressure of the mass during the method at a level or levels above atmospheric pressure, with the mouth being the only outlet for the mass from the chamber. The closed chamber also shields the mass from the atmosphere, e.g. to avoid inclusion of air into the mass, as it only has the inlet that is connected to the pump and the mouth that is directly adjacent the outer surface of the revolving drum.

In a practically preferred embodiment, as is known from prior art drum moulding installations, the mouth is a closed contoured singular straight slot that is arranged parallel to the longitudinal axis of the drum. Most preferably the slot has rectilinear and parallel leading and trailing edges, e.g. with the trailing edge embodied as or provided with a knife formation to cut fibres in the mass, e.g. fibrous elements in a ground meat mass. In an alternative, yet less preferred, embodiment the mouth is composed of an array of mouth openings, e.g. slotted openings along a common line parallel to the axis of the drum. Such a design with an array of mouth openings in the mass feed member is regarded as less versatile in combination with various drums having different mould cavities patterns that can be commonly exchanged for one another in these devices without having the need to exchange the mass feed member as well.

In another embodiment the mouth is a closed contoured singular slot that is helically shaped so as to extend as a helix segment in longitudinal direction and circumferential direction relative to the mould drum surface. So instead of the well known straight slot shaped mouth that extends parallel to the drum axis this design requires that said mouth extends in a helix closely adjacent the curved outer drum surface. In the scope of the present invention such a helix design of the mouth may allow for the mould cavities in the drum surface to be arranged in rectilinear rows, parallel or possibly nearly parallel, to the drum axis and the rows offset from one another in circumferential direction. It will be appreciated that whilst this helical mass feed member may be more complex than an embodiment with a straight slot, the design of the drum may be less complicated due to a simpler pattern of the mould cavities therein. The actual shape of the mouth of the mass feed member and the layout of the mould cavity pattern, in combination with the operation of the pump and the rotary drive of the mould drum, is still governed by the inventive requirement that all filling events are performed in succession during a revolution of the drum, preferably with a pause between successive filling events. An advantage of such a helix design of the mouth may also lie in the release of the food products from the mould cavities when these are arranged in rectilinear rows parallel to the drum axis, as this release can then be effected with less complexity or more efficiently than with mould cavities arranged in another pattern.

The inventors envisage that such a mass feed member design of the moulding device can also be advantageous in methods and devices wherein the filling events are not necessarily in sequential order.

In another embodiment the mouth is composed of multiple staggered slot sections with one section being offset from the one or more adjacent slot sections in the circumferential direction of the mould drum. This mimics a helical design of the mouth and provides the same effects yet with less complexity of the mass feed member itself as to its structure. The inventors envisage that such a mass feed member design of the moulding device can also be advantageous in methods and devices wherein the filling events are not necessarily in sequential order.

As explained above the mould drum devices are predominantly chosen for their high capacity. This capacity can amongst others be enhanced by increasing the length of the drum so as to mould more food products with a single drum or at least to eject food products along a greater length of the drum. This is seen as beneficial for large capacity food producing installations, e.g. as the moulded food products may be received on a conveyor of significant width, e.g. of 0.8 or 1.0 meter that passes into a further treatment device, e.g. into an oven or a fryer.

In view of increasing length of the drum the invention, in an embodiment thereof, envisages a installation comprising not just a single mass feed member at the fill position, but with at least a first and a second mass feed member that are arranged at the fill position in side by side arrangement. Herein each mass feed chamber has a chamber therein for the mass that is separated from the chamber of the other mass feed member, preferably with a first and a second pump respectively connected to the first and second mass feed member. The installation has a single mould drum with a first section of the drum surface passing along the first mass feed member and a second section passing along the second mass feed member during revolution of the drum. The mould cavities of said single drum are filled by said first and second mass feed members, wherein each of the first section and the second section of the drum surface have multiple mould cavities that are arranged in a mould cavities pattern for each drum surface section with cavities at multiple (at least two, e.g. four or more) longitudinal positions when seen in longitudinal direction of the drum and at multiple circumferential position when seen in circumferential position of the drum. In the invention the requirement is applied that for each mass feed member and corresponding drum surface section all filling events are performed in sequential order.

The inventors envisage that such dual or multiple mass feed member design of the moulding installation can also be advantageous in methods wherein the filling events are not necessarily in sequential order.

In a practical embodiment the mould cavity pattern is composed of mould cavities of identical dimensions, e.g. to mould meat patties with circular contour.

The present invention also relates to a method for moulding meat products, e.g. hamburger patties, from a pumpable ground meat mass, wherein use is made of a moulding installation for moulding meat products from a pumpable ground meat mass, which installation comprises:
  a frame,
  a mould drum having an outer circumferential drum surface and a longitudinal drum rotation axis, the drum being rotatably supported by the frame to revolve about the drum rotation axis,
  wherein the mould drum has in the drum surface multiple mould cavities, each having a fill opening for the introduction of ground meat mass into the mould cavity,
  a mould drum drive coupled to the drum to drive the drum in a rotation direction,
  a mass feed member stationary arranged at a fill position relative to the drum surface, said mass feed member having a single chamber with an inlet for ground meat mass to introduce said ground meat mass into the chamber and with a mouth facing the drum surface, said mass feed member being adapted to transfer ground meat mass into passing mould cavities of the rotating mould drum when the filling opening of a mould cavity is in communication with the mouth at said fill position, said ground meat mass forming a ground meat product in said mould cavity,
  a pump connected to the inlet of the mass feed member and adapted to feed ground meat mass under pressure into the chamber of the mass feed member,
  wherein the mould cavities are arranged in the drum surface in a mould cavities pattern with cavities at multiple longitudinal positions when seen in longitudinal direction of the drum and at multiple circumferential positions when seen in circumferential position of the drum,
  wherein the method comprises:
  driving the drum in said rotation direction in a continuous, non-interrupted manner;

operating the pump so as to feed ground meat mass to the mass feed member and establish a ground meat mass pressure in the chamber of said mass feed member, transfer of pressurized ground meat mass via the mouth into each passing mould cavity in a corresponding mould cavity filling event that is defined by the moment of first flow of foodstuff mass into the mould cavity and the moment wherein the mould cavity has been fully filled and flow of ground meat mass therein is terminated, release of moulded products from the mould cavities, and wherein the operation of the pump and the rotation of the mould drum are controlled in combination with the design of the mould cavities pattern on the drum and of the mouth of the mass feed member such that in the method all mould cavity filling events during a revolution of the mould drum are performed in sequential order, preferably with a pause between each pair of successive filling events wherein effectively no flow of ground meat mass out of the mouth takes place.

The present invention also relates to an installation that is adapted to perform the inventive method, e.g. with the installation having a computer control for the drum rotation and operation of the pump, said control being programmed to perform the inventive method, e.g. with a memory containing predetermined routines that make the installation perform the inventive method for selected foodstuff masses.

The invention will be explained below with reference to the drawings.

DETAILED DESCRIPTION OF PREFERRED EMBODIMENTS

Figure 1:
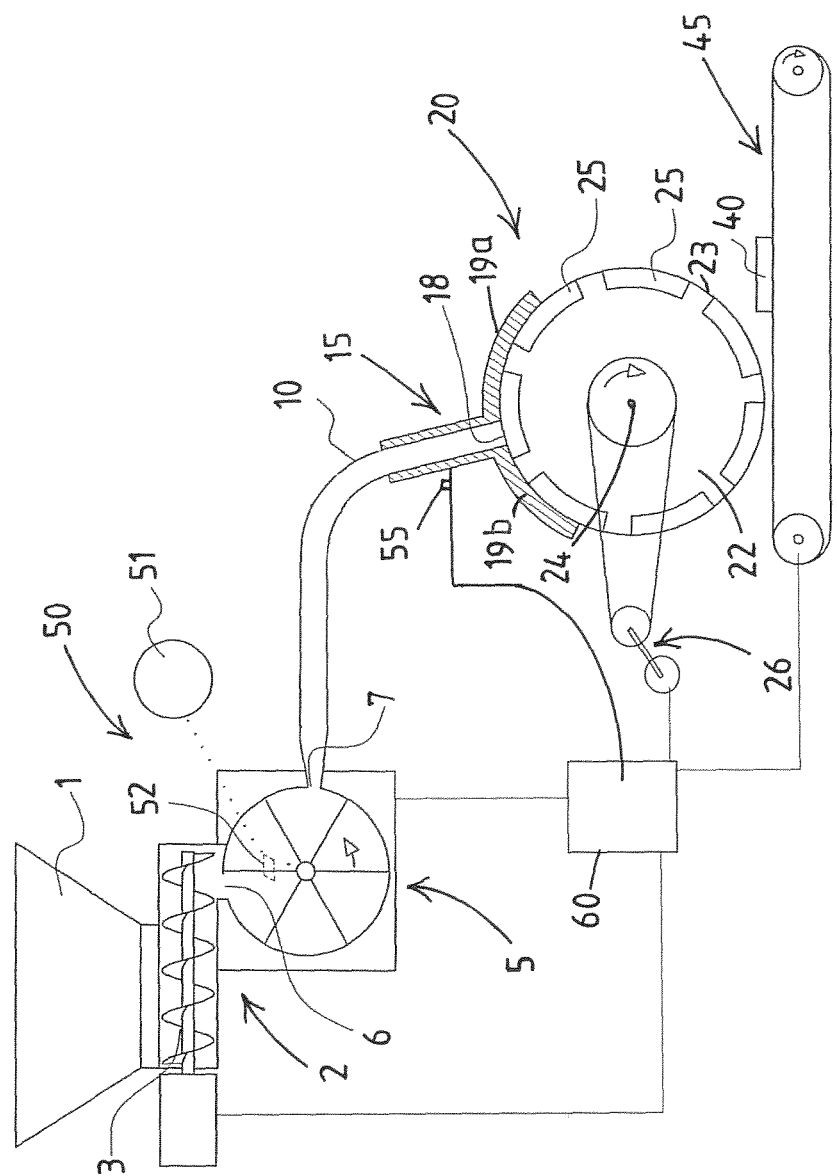
FIG. 1 shows schematically a moulding installation for moulding food products from a pumpable foodstuff mass.

FIG. 1 schematically depicts a high capacity installation for the moulding of three dimensional products from a mass of pumpable foodstuff material, for example from a ground meat mass, e.g. for the production of hamburger patties.

A batch of ground meat mass, e.g. of beef, pork, or poultry meat, is commonly prepared with a meat grinding device or a mixer/grinding device. A batch is e.g. loaded into a (wheeled) bin and then transported to the installation. Instead of loading a hopper of the installation with bins, the loading may be conducted via a pipe connecting to the installation, e.g. to a hopper thereof.

In this example it is illustrated that the installation may comprise a hopper 1 that is adapted to receive one or more batches of the mass of pumpable foodstuff material, e.g. ground meat.

In this example it is illustrated that an optional feeder assembly 2 is associated with the hopper 1 to assist in discharging the mass from the hopper 1. In this example one or more motor driven augers 3 are mounted at the bottom of the hopper 1.

The installation comprises a pump, as is preferred a positive displacement pump 5, having an inlet 6 receiving the mass from the hopper 1, here via the auger 3.

The pump 5 further has an outlet 7 for outputting the mass.

The pump 5 shown is (as is preferred in the invention) a vane pump with a rotor having multiples vanes disposed in a pump cavity of a pump housing. Such rotor pumps, e.g. supplied by Risco (Italy), are known for pumping ground meat and other pumpable foodstuff masses.

Figure 2:
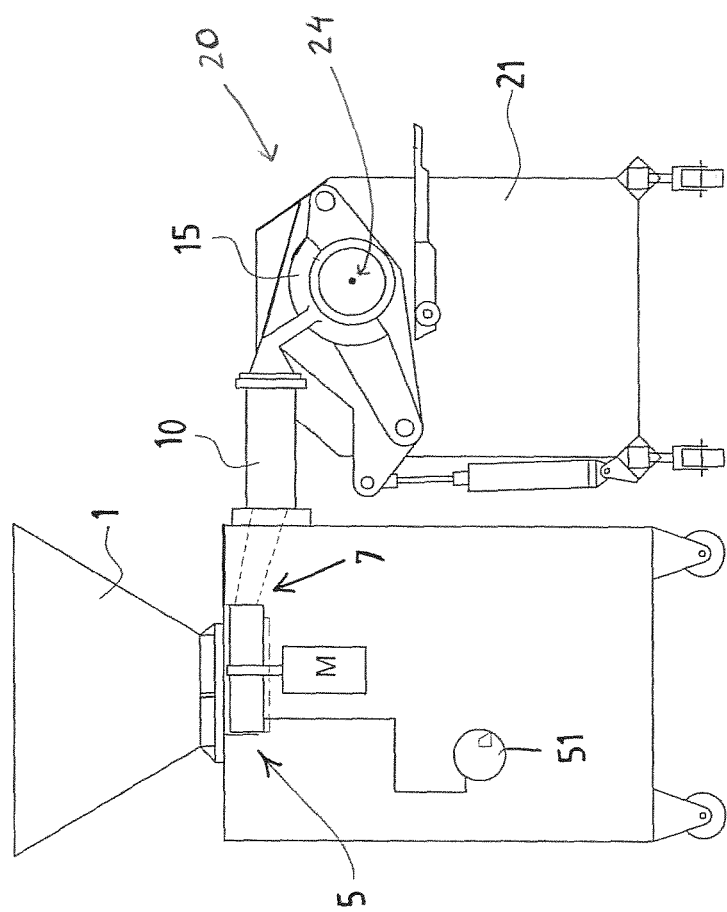
FIG. 2 an exemplary embodiment of a moulding installation for moulding food products from a pumpable foodstuff mass.

A pump drive motor (e.g. electric, shown at M in FIG. 2) is provided for driving the pump. The pump 5 forms pump chambers, in the figure shown between neighbouring vanes, that each are successively in communication with the pump inlet 6 for the introduction of mass into the pump chamber and with the pump outlet 7 for the discharge of mass from the pump chamber. The effective volume of the pump chamber reduces from the position thereof at the pump inlet to the position thereof at the pump outlet, so that the mass is effectively expelled from the pump chamber when the pump is in operation. An example of such a pump is disclosed in U.S. Pat. No. 4,761,121.

The pump 5 may instead of a vane pump also be embodied as a different type of pump, e.g. as a piston pump having one or more reciprocating pistons.

A pumped mass supply tube 10 is connected to the outlet 7 of the pump 5. This tube 10 extends from the pump outlet to an inlet 17 of a mass feed member 15 of a food products moulding device 20 of the installation and serves to convey the outputted mass to the mass feed member 15.

Figure 3:
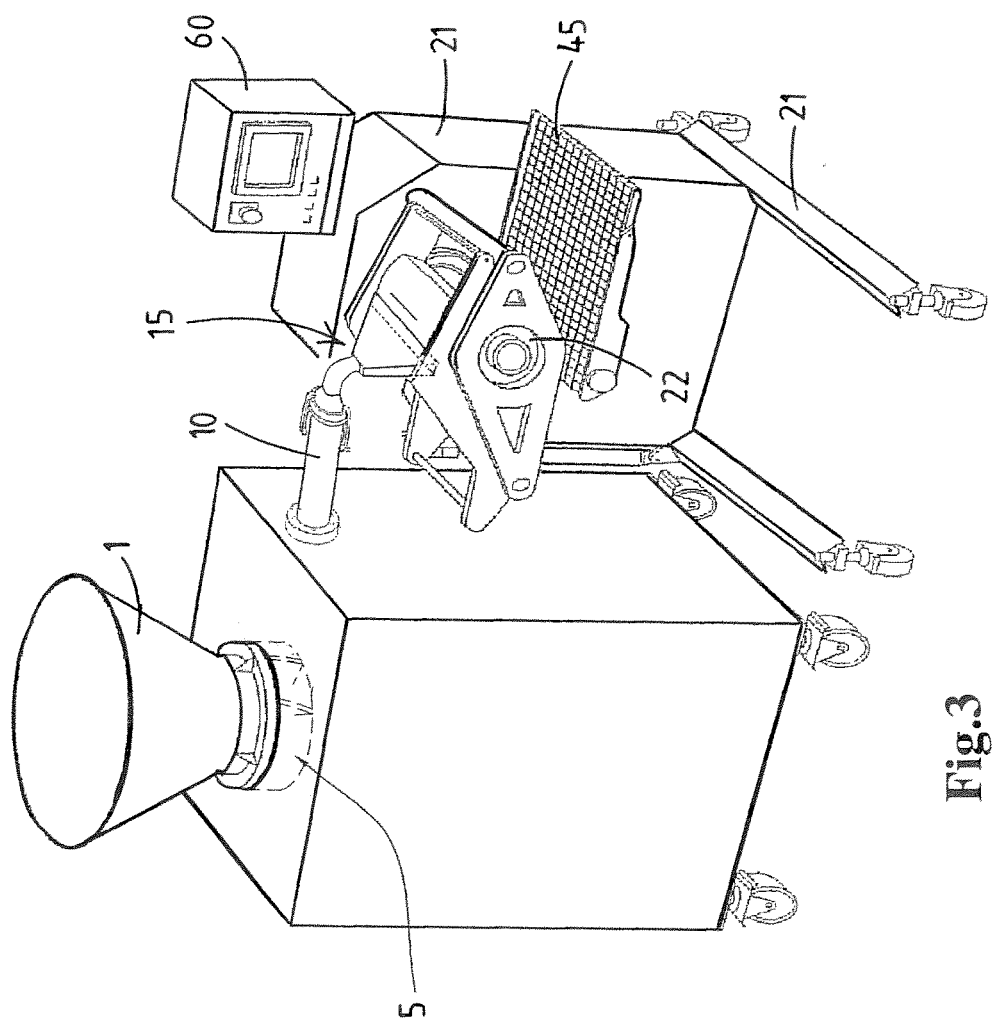
FIG. 3 the installation of FIG. 2 in a different view

The moulding device 20 comprises a frame 21 (depicted in FIGS. 2 and 3) and a rotating or revolving mould drum 22, the drum 22 being rotatably supported by the frame 2, e.g. on a cantilevered shaft of the device 20. Preferably the device 20 and drum 22 are designed to allow for an easy exchange of one drum for another drum having a different pattern and shape of mould cavities so as to allow the production of different food products with the installation.

The mould drum 22 has an outer circumferential drum surface 23 and a longitudinal drum rotation axis 24. The drum 22 is rotatably supported by the frame 21 to revolve about the drum rotation axis, here—as is preferred—a horizontal axis.

The mould drum 22 has in the drum surface 23 multiple mould cavities 25, each cavity 25 having a fill opening in the plane of the surface 23 for the introduction of foodstuff mass into the mould cavity and for the later removal or release of the product from the cavity 25. The cavities 25 are embodied as individual recesses in the outer surface 23 of the drum body, having a bottom opposite the filling opening of the cavity.

The mass feed member 25 is arranged at a fill position adjacent the drum surface 23. Here, as is preferred, the fill position is a stationary fill position.

A mould member drive 26 is provided for rotating, preferably an electric drive allowing for a variable and controllable drum rotation speed. In use of the installation it is envisaged that the drum 22 is driven in a continuous, non-interrupted manner, so without starting and stopping during a revolution of the drum in order to achieve a high production capacity. As explained it is preferred that the drum 22 is driven at a constant speed during normal production (e.g. with an acceleration when starting production). It may also be that the speed of the drum 22 is periodically varied during a revolution of the drum e.g. as explained herein, yet without stopping and starting.

In general a cavity 25 is filled with foodstuff mass if the filling opening thereof comes into communication that allows the pressurized mass in the mass feed member to flow via a mouth 18 of the mass feed member 15 into the cavity 25.

Figure 4:
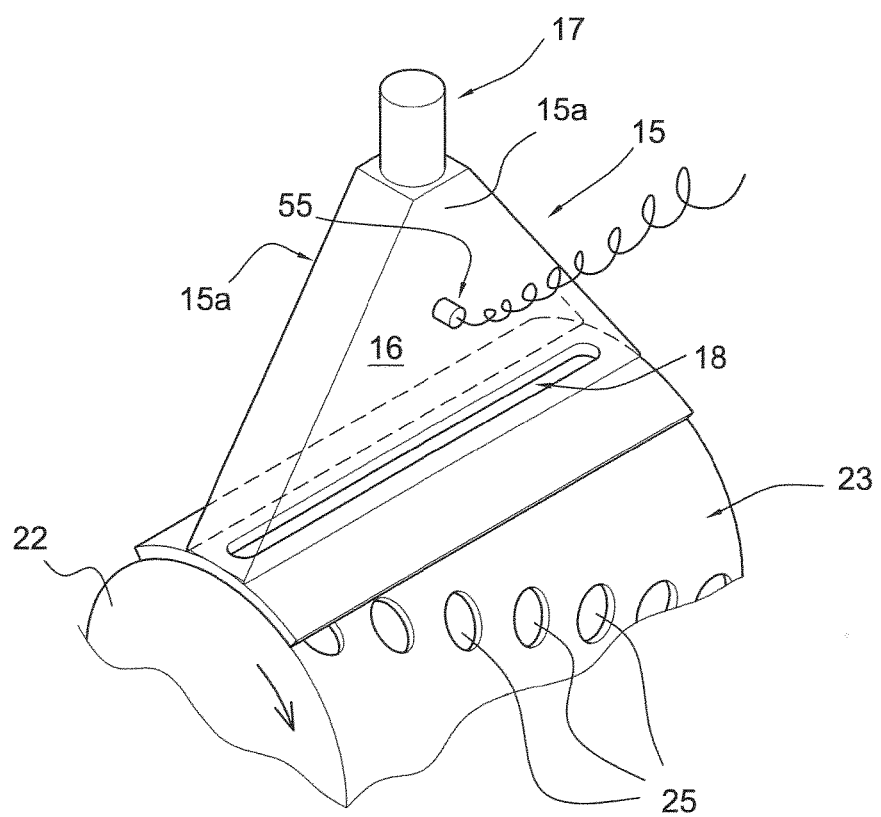
FIG. 4 a part of the mass feed member and the mould drum of the moulding device in FIGS. 2 and 3.

An example of the mass feed member 15 is depicted in more detail in FIG. 4.

The mass feed member 15 has a single internal chamber 16 with an inlet 17 for foodstuff mass that is connected, e.g. via a releasable coupling, to tube 10 and thereby to the pump 5 in order to introduce foodstuff mass into the chamber 16. The member 15 has a mouth 18 facing or directly adjacent the drum surface 23 with cavities 25. The mouth 18, as is generally preferred in the context of the present invention, is preferably a non-valved, continuously open mouth. The member 15 is adapted to transfer mass into passing mould cavities 25 of the rotating mould drum 22 when the filling opening of a mould cavity 25 is in communication with the mouth 18 at the fill position, the mass forming a food product in the mould cavity.

As is preferred the mass feed member 15 sealingly engages the surface 23 of the drum 22 in which the cavities are formed, so that substantially no mass may escape between the mass feed member and the mould drum.

As is preferred the mass feed member 15 is integrated with a closure member 19a that extends in downstream direction from the mouth 18 of the mass feed member to keep the filled cavities closed for a while as the filled cavities move away from the fill position. This allows the mass to become a more coherent food product. The mass in the mould cavity forms the food product, e.g. the meat patty. As shown a closure member 19b is preferably provided to extend from the mouth 18 in upstream direction, in order to closure the cavity as it is in communication with the mouth 18.

Optional details of a mould drum, mass feed member, and closure member, are e.g. disclosed in WO00/30548 and in WO2004/002229.

For example, the one or more closure members 19a, b may each comprise a semi-circular plate member, preferably of flexible design, that is urged in sealing contact with the surface 23 by one or more actuators, e.g. pneumatic actuators, e.g. with transverse lamellae between the plate member and the one or more actuators.

The pump 5 urges the foodstuff mass through the tube 10 towards the mass feed member 15 and into the single chamber 16 thereof. By suitable control of the pump 5, e.g. of the pump rotor speed, e.g. using a controllable electric pump drive motor M, the output of mass by the pump and thereby the pressure of the mass in the chamber 16 of mass feed member 15 can be controlled. As will be explained below in more detail this pressure control may include the sensing of the actual pressure of the mass in the chamber 16 by a pressure sensor, said signal acting as a feedback signal for a pump control unit.

The FIGS. 1 and 4 illustrate the preferred feature that the device comprises a foodstuff mass pressure sensor 55 that is adapted to sense pressure of the foodstuff mass in the chamber 16 of the mass feed member 15.

The device comprises a control unit 60, at least for the pump 5 but as is preferred also for the drum rotation drive 26, which unit 60 is preferably connected to the foodstuff mass pressure sensor 55 to control operation of the pump amongst others on the basis of the sensed actual mass pressure in the chamber 16.

At a release position that is downstream of the fill position the formed product, here meat product 40, is released from the mould cavity 25, e.g. to be transported onward on a conveyor 45, e.g. to other downstream equipment, e.g. an oven, a fryer, etc. The release from the mould cavity 25 may be assisted by pneumatic pressure, e.g. as the wall of the mould cavity comprises one or more sections of porous material through which pressurized air or gas is forced thereby assisting the release of the product. A mechanical ejector member may also be provided to perform or assist in the release of the product from the mould drum 22. For example the bottom of the mould cavity in the drum may be formed by a mobile piston member, that allows to eject the formed product from the cavity, possibly the piston being porous to allow for the use of air to release the product from the piston.

The installation may comprise a controllable vacuum assembly 50, here integrated with the pump 5 as is known in the art. This vacuum assembly 50 is adapted to cause controlled evacuation of air from the mass at one or more locations in the trajectory of the mass from the hopper 1 to and including the pump chamber at a position where it is in communication with the pump inlet 6 of the positive displacement pump. As is preferred, this vacuum assembly comprises a vacuum pump 51, e.g. an electrically operated vacuum pump.

As is preferred, a vacuum port 52 is arranged in the pump 5 so as to be effective in establishing a vacuum in the pump chamber that is in communication with the inlet 6 during operation of the pump 5. This vacuum assists in the complete filling of the pump chamber with a portion of the mass.

If desired a vacuum may be created in the hopper 1 as is known in the art. A vacuum may also be created in any passage between the hopper 1 and the pump inlet 6, e.g. in a duct into which one or more augers 3 of a feed assembly extend.

A vacuum assembly 50 allows the evacuation of the foodstuff mass, e.g. the ground meat mass, so as to reduce the presence of air in the mass. This e.g. increases the uniformity of the products when it comes to the weight of mass that is effectively introduced into each of the mould cavities, among other advantages.

The drum 22 is provided with multiple mould cavities 25 which are arranged in the drum surface 23 in a mould cavities pattern with cavities at multiple (possibly two, preferably four or more) longitudinal positions when seen in longitudinal direction of the drum 22 and at multiple circumferential positions when seen in circumferential position of the drum 22. So in general terms a 2-dimensional pattern of cavities in the surface 23 of the drum 22.

The production of the food products with the installation comprises:

driving the drum 22 in a rotation direction in a continuous, non-interrupted manner; so without starting and stopping the drum in its revolution, operating the pump 5 so as to feed foodstuff mass to the mass feed member 15 and establish a foodstuff mass pressure in the chamber 16 of the mass feed member 15, transfer of pressurized foodstuff mass via the mouth 18 into each passing mould cavity 25 in a corresponding mould cavity filling event that is defined by the moment of first flow of foodstuff mass into the mould cavity 25 and the moment wherein the mould cavity 25 has been fully filled and flow of foodstuff mass therein is terminated, and release of the moulded product from the mould cavity 25.

In the invention the operation of the pump 5 and the rotation of the mould drum 22 are controlled in combination with the design of the mould cavities pattern on the drum 22 and of the mouth 18 of the mass feed member 15 such that in the method all mould cavity filling events during a revolution of the mould drum 22 are performed in sequential order. Thereby only one filling event takes place at any given moment.

Figure 6A:
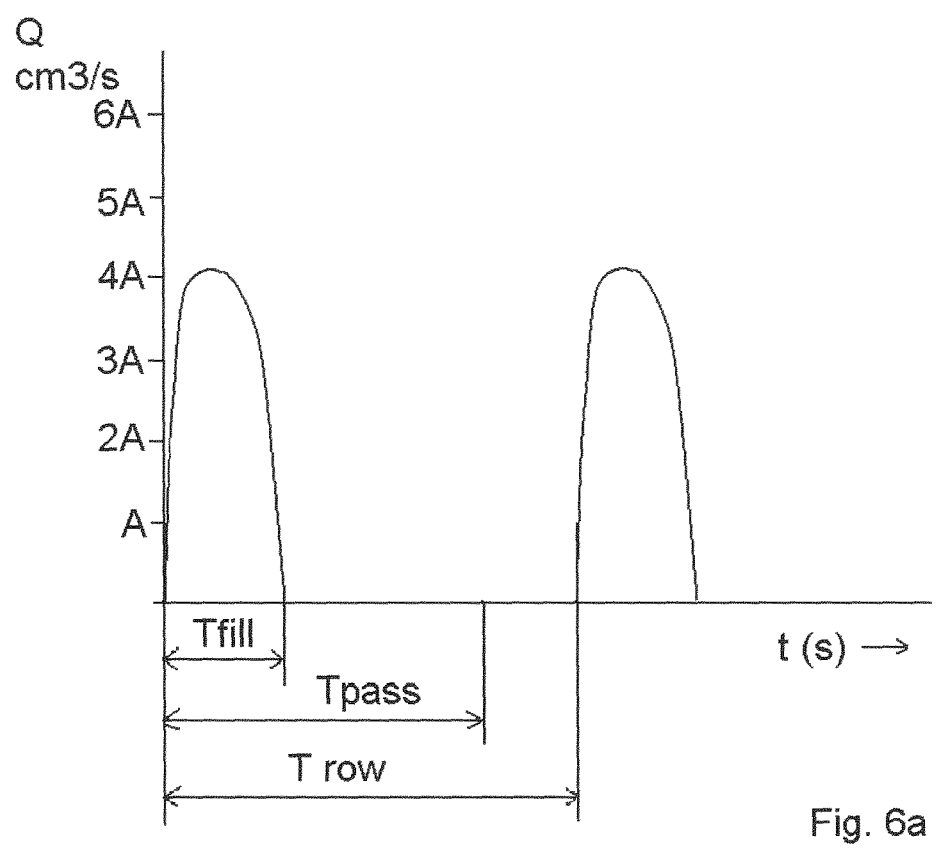
FIG. 6a an example of mass outflow from the mouth in a method according to the prior art.
Figure 6B:
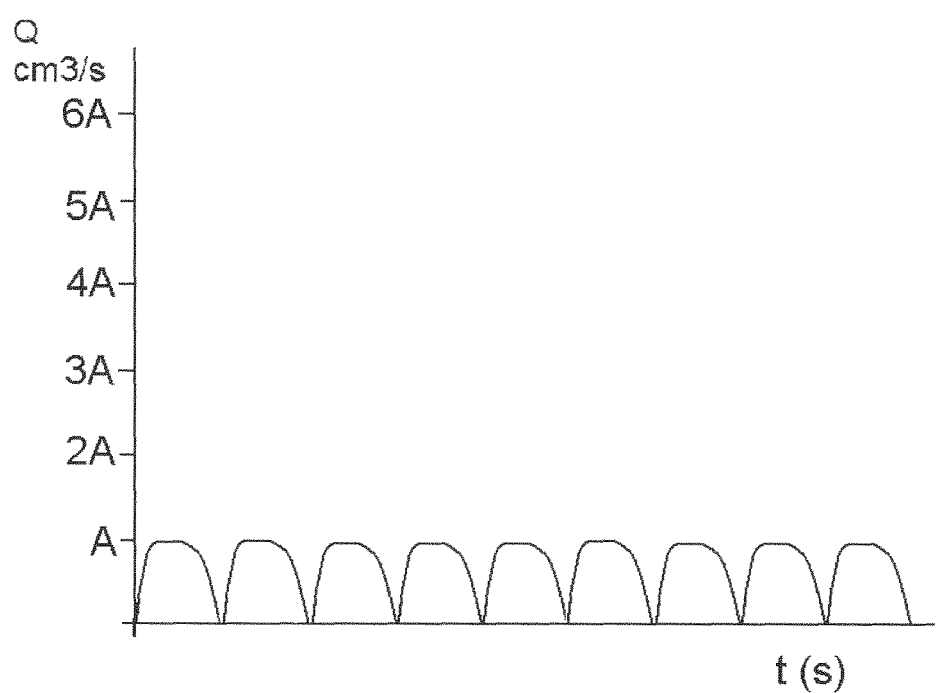
FIG. 6b an example of mass outflow from the mouth in a method according to the invention.

FIGS. 6a and 6b are now used to illustrate and explain the effect of the invention in terms of the outflow of mass from the mouth 18 of the chamber of the mass feed member 15 into the mould cavities during operation of the installation.

Figure 5A:
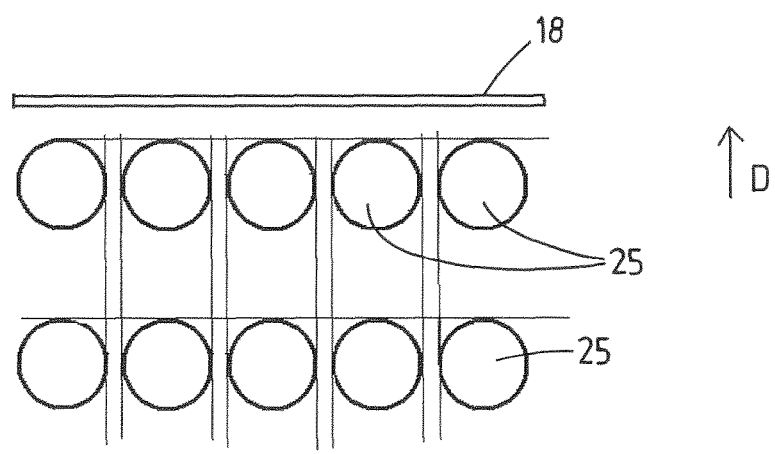
FIGS. 5a-c different patterns of mould cavities on the outer drum surface of a mould drum.

In FIG. 6a a theoretical graph is shown depicting the outflow of mass from the mouth of the mass feed member along the vertical axis (Q in cm3/s) with the horizontal axis representing time. The graph shows a prior art method wherein use is made of a mass feed member with a rectilinear slot shaped mouth that is parallel to the longitudinal axis of the drum, as well as of a mould drum with multiple straight rows of mould cavities, here as example five cavities per row as shown in FIG. 5a, which rows are each parallel to the longitudinal axis of the drum and are offset from one another in circumferential direction. As a result of this design of the mouth and of the drum all the cavities in a particular row to be filled reach the mouth at the same time, and the filling of all cavities of the row is effected generally simultaneously. The graph depicts the Tfill which is the fill time which corresponds to the time between the start of actual inflow of mass into the cavities and the moment that all cavities of the row are filled and the actual filling is completed. The filling of all cavities is commonly completed well before a row of cavities has passed along the mouth, e.g. within about 40% of the time required for passage of the row of cavities underneath the mouth. The Tpass in this graph depicts the passage time wherein the row of mould cavities pass underneath the mouth. Then, as is common, it takes a while for the next row of mould cavities to reach the mouth, as the one row is parallel to and circumferentially offset from the following row in this prior art approach. Therefore T row in FIG. 6a depicts the time between the start of filling of one row and the start of filling of the next row.

As can be seen, in this prior art approach the filling of successive rows of cavities entails short filling periods wherein a high outflow of mass from the mouth takes place with intermediate lengthier periods wherein no outflow from the mouth takes place.

FIG. 6b illustrates in a similar graph an example of the method according to the invention wherein the operation of the pump and the rotation of the mould drum are controlled in combination with the design of the mould cavities pattern on the drum and of the mouth of the mass feed member such that in the method all mould cavity filling events during a revolution of the mould drum are performed in sequential order. Here it is assumed that the scale is the same as in the graph of FIG. 6a and that five cavities are filled within the same time as the time T row in FIG. 6a which represents the prior art approach filling of one row with five cavities.

As can be seen the filling of each cavity is a unique filling event, with the outflow from the mouth being limited to said one cavity that is actually filled. Only after completion of the filling of said one cavity, the inflow into the next cavity starts, and so on.

As is preferred in the invention there may be a short pause between each pair of successive filling events wherein effectively no flow of foodstuff mass out of the mouth 18 takes place.

In an embodiment of the invention the method comprises selecting a target pressure or target pressure range for the foodstuff mass in the chamber 16, and programming the pump control unit 60 such that it stops or slows the pump 5 when the measured foodstuff pressure exceeds the target pressure or the target pressure range and such that the control unit 60 activates or accelerates the pump 5 when the measured foodstuff pressure drops below the target pressure or target pressure range.

Figure 7A:
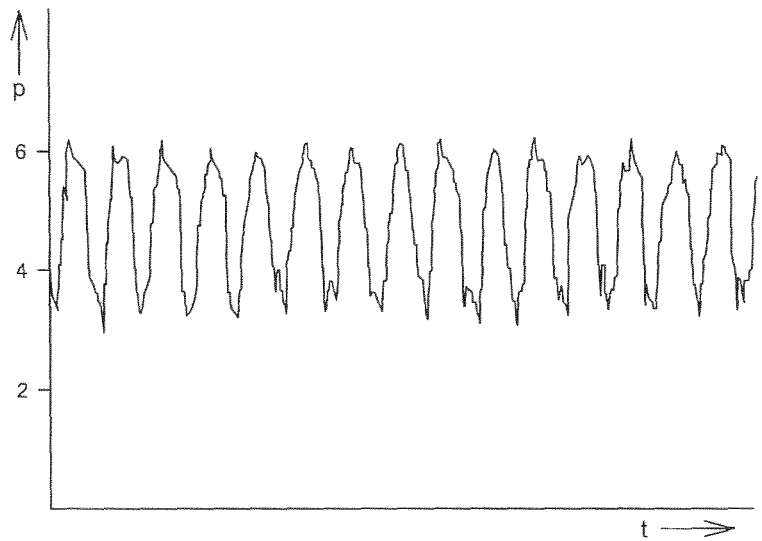
FIG. 7a an example of mass pressure in the mass feed member measured in a method according to the prior art.
Figure 7B:
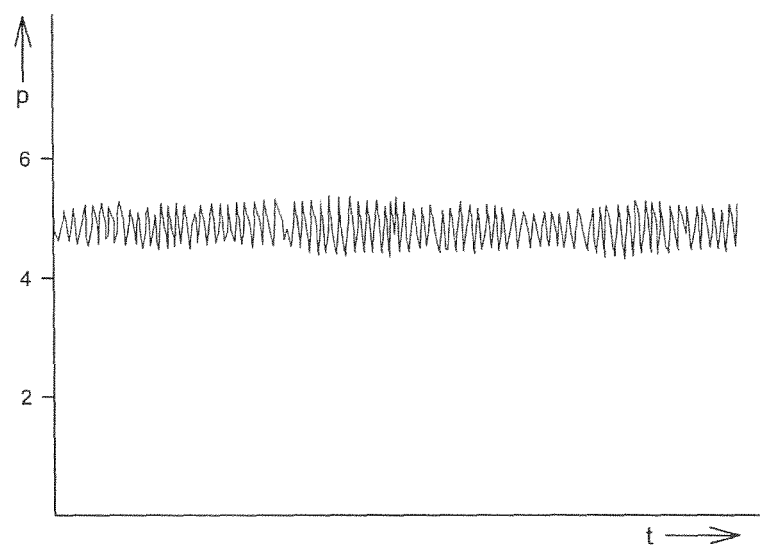
FIG. 7b an example of mass pressure in the mass feed member measured in a method according to the invention.

As expressed above, a preferred embodiment envisages that there is an actual pause in between successive filling events such that as one filling event is terminated it takes a short while before the next filling event starts. This approach, even though in real terms the pause is very short, effectively guarantees in practice the existence of only one filling event at each moment during the revolution of the drum. The pause can also be advantageously used to allow the pump 5 to make up or restore the pressure within the chamber 16 of the mass feed member 15, preferably to a predetermined target pressure or target pressure range which is monitored here by means of the pressure sensor 55. This approach allows to avoid the use of a high filling pressure of the mass, which is in particular advantageous for ground meat mass, as a high filling pressure in practice requires the pump to supply mass at a rate well above the average rate wherein mass is filled into the mould cavities. By letting the pump 5 supply mass at a lower rate one can observe in an embodiment of the inventive method that as a consequence of mass flowing into the mould cavity the mass pressure in the chamber 16 drops as the outflow effectively exceeds the inflow. The pause between filling events then allows the pump 5 to restore the mass pressure in the chamber 16. For example the pump 5 is slowed down or switched off once the pressure of the mass has reached the target pressure or target pressure range during this pause. FIG. 7b illustrates by way of example the mass pressure in the mass feed member chamber in such an operation.

FIG. 4 illustrates a practical embodiment of the mass feed member 25 which comprises a funnel body 25a delimiting the chamber. The body 25a has main walls 25b of substantially triangular shape that are connected along a mouth side thereof by a wall containing the mouth 18 and with the inlet 17 arranged at the apex of the main walls 25b that is located opposite the wall containing the mouth 18, such that the effective cross section of the chamber 16 increases from said inlet 17 towards said wall containing the mouth 18.

FIG. 4 illustrates the embodiment wherein the mouth 18 of the mass feed member is a closed contoured singular straight slot that is arranged parallel to the longitudinal axis of the drum 22. As is common and preferred, the mouth 18 is a non-valved, continuously open slot.

Figure 8:
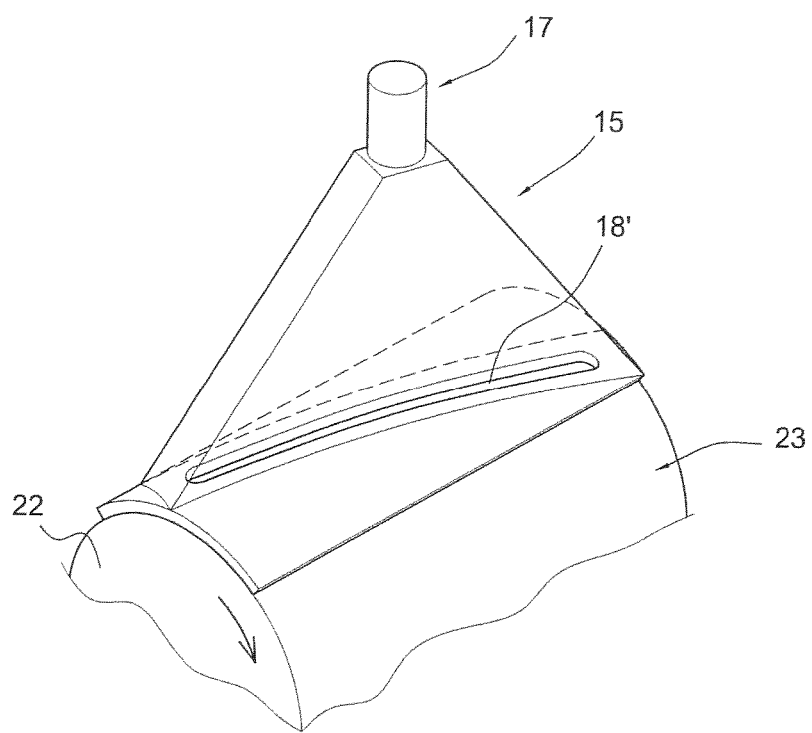
FIG. 8 an example of a mass feed member and the mould drum of the moulding device.

FIG. 8 illustrates an embodiment wherein the mouth 18' is a closed contoured singular slot that is helically shaped so as to extend as a helix segment in longitudinal direction and circumferential direction relative to the mould drum 22. As is common and preferred, the mouth is a non-valved, continuously open slot.

Figure 9:
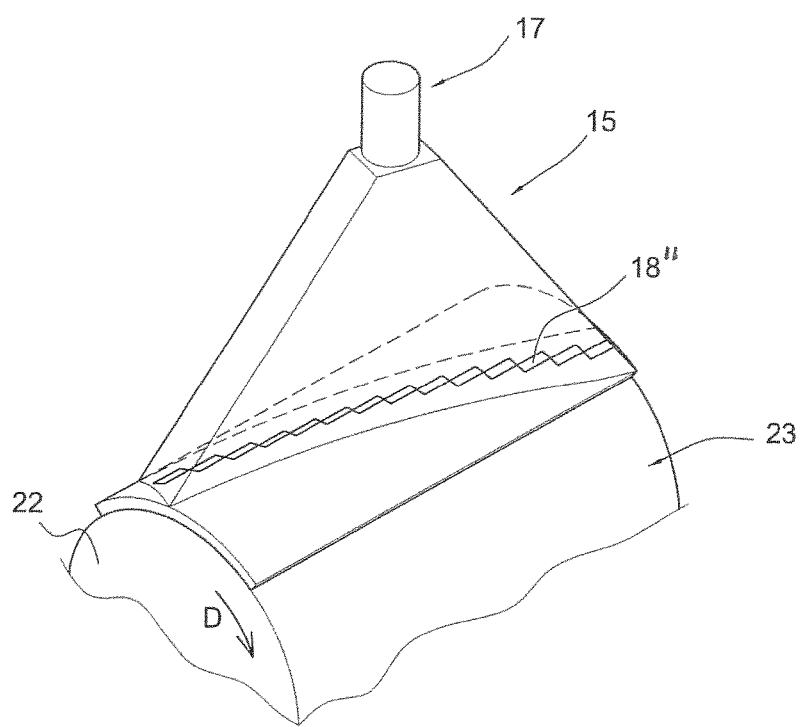
FIG. 9 another example of a mass feed member and the mould drum of the moulding device.

FIG. 9 illustrates an embodiment wherein the mouth 18" is composed of multiple staggered slot sections with one slot section being offset from the one or more adjacent slot sections in the circumferential direction of the mould drum. As similar design can be obtained when the slot sections are interconnected to form a closed contoured singular slot.

The skilled person will appreciate that other shapes of the mouth 18 of the mass feed member that are non-straight and non-parallel to the drum axis are also possible, e.g. with the mouth 18 having (seen from above) a semi-circular, sinoid, V, U, or other shape.

As explained above the common prior art approach is to make use of a drum with straight rows of cavities 25 that are circumferentially offset from one another. The prior art approach is to use such a drum in moulding device having a mass feed member with a mouth 18 that is straight and parallel to the drum axis. This prior art approach is schematically illustrated in FIG. 5a, wherein a portion of the cavity pattern is shown (2 rows of five cavities) and the mouth 18. The drum moves in direction D towards the mouth 18. The lines parallel to the mouth and at right angles thereto are merely shown as a grid in axial and circumferential direction of the drum surface.

As a result of this prior art approach the cavities 25 in a row all reach the mouth 18 at the same time. As the invention now teaches, this prior art approach does not entail that all filling events of the cavities in a single row are the same, as the mass will have a tendency to flow into one of the cavities 25 slightly ahead of the others in the row with resulting differences in the filling of these cavities and resulting non-uniformity of the produced food products. However, as all filling events are effected generally simultaneously, the outflow of mass via the mouth 18 is significant and the pressure drop in the chamber 16 of the mass feed member is equally significant. This is depicted by way of example in FIG. 7a wherein the mass pressure in the mass feed member is shown during operation as is done in this prior art approach. One recognizes that the frequency of the mass pressure in chamber 16 versus time graph corresponds to the passage of entire rows of cavities underneath the mouth 18. Also the amplitude is significant (pressure in bar) as the outflow into a row of cavities of the mould is not directly replenished by operation of the pump 5.

The skilled person will appreciate that filling a mould cavity can, and in practice normally is, completed well before the trailing edge of the cavity 25 reaches the mouth 18. The filling starts commonly as soon as there is such an overlap between the filling opening and the mouth that the pressurized mass can flow through this overlap. The mass will then seek to fill the entire cavity, which is commonly completed ahead of the trailing edge of the cavity reaching the mouth 18. Once the cavity has been filled the flow into the cavity ceases and the filling event of the cavity is terminated.

Figure 5B:
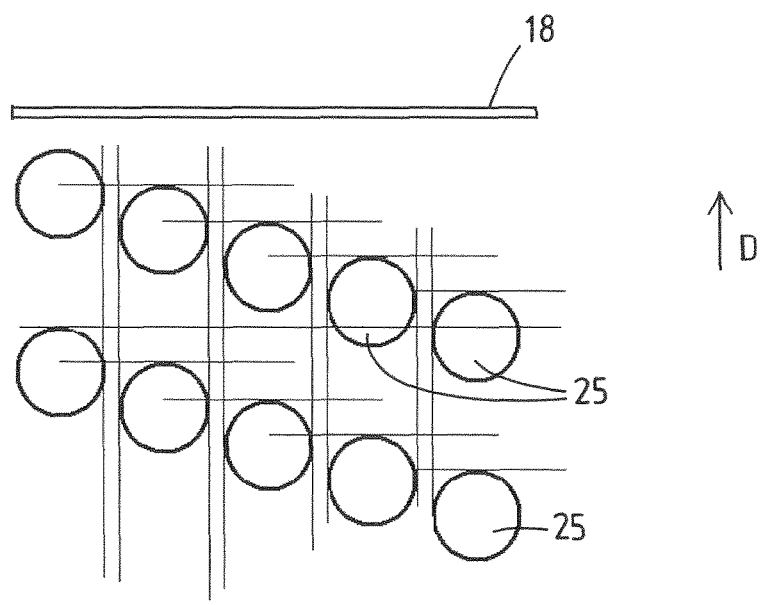

When using a mass feed member with a mouth 18 that is straight and parallel to the drum axis, the invention will not allow for the use of a drum as shown in FIG. 5a as the filling events will then not be performed in sequential order. FIG. 5b shows a possible pattern of mould cavities 25 in the drum that may then be appropriate to perform the inventive method, with the cavities 25 being arranged in rows that extend helically over the surface of the drum. Again the lines in the figure depict the axial and circumferential direction of the drum. As explained the output of the pump 5 and rotational speed of the drum 22 can then be controlled to achieve the sequential filling events. For example suitable settings and/or design of the pattern of cavities can be determined by performing test runs with the foodstuff mass that one desires to fill into the cavities.

Figure 5C:
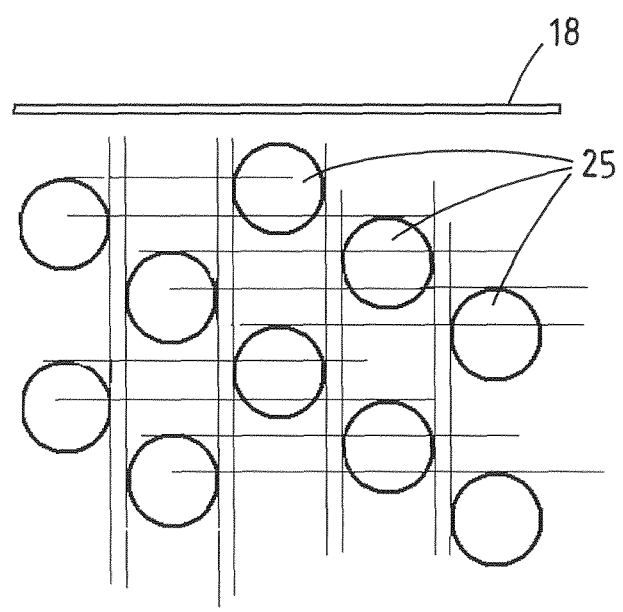

FIG. 5c shows yet another design of the pattern of mould cavities of the drum. It is noted that in this design, the location where actual outflow of mass via the mouth takes place "jumps" from one axial section of the mouth to a remote axial section, with the intermediate section only seeing outflow of mass into a cavity at a later stage of the filling process. In the FIG. 5b pattern the cavities in a helical row are filled in succession when seen in helical direction of the drum.

Figure 5D:
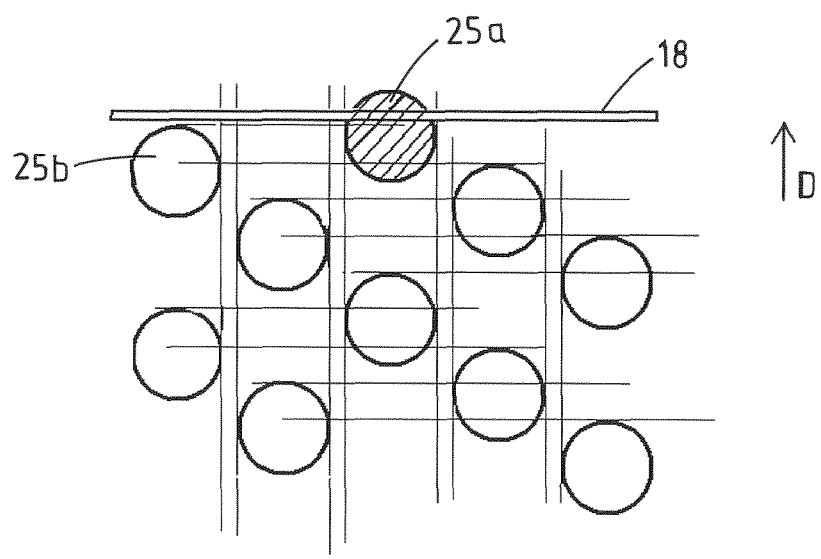
FIGS. 5d-e show a relative position of the mouth of the mass feed member during filling of the mould cavity of FIG. 5c.

In FIG. 5d it is illustrated that the mouth 18 and cavity 25 are in overlapping position and the cavity has already been completely filled with the mass, e.g. ground meat (shown by hatching). So the filling event of this individual cavity has been completed, clearly ahead of the trailing end of the cavity reaching the mouth 18. It can also be seen that from this termination moment, it takes a little while before the mouth 18 comes into communication with the cavity 25b, which is the successive cavity to be filled with the mass.

Figure 5E:
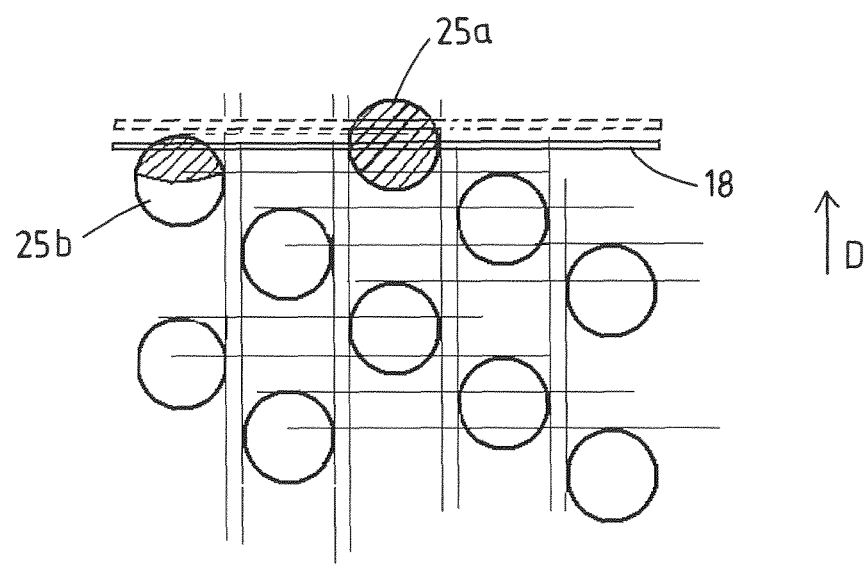

In FIG. 5e the process is shown slightly later, with the mouth 18 now in overlap with cavity 25b also. The overlap with cavity 25a does not result at this moment into a flow of mass into said cavity 25a as this cavity 25a had already been fully filled. So there is only one filling event, namely the filling of cavity 25b. This is shown by hatching and one can see the mass flowing into the cavity to fill the cavity.

FIG. 7b illustrates an example of a measurement of the mass pressure in the mass feed member during operation as is done in the inventive method. One recognizes that the frequency of the mass pressure in chamber 16 versus time graph corresponds to the individual filling events of the cavities, and thus effectively to the number of cavities that pass underneath the mouth 18. It can be easily recognized and understood that in this approach the amplitude of the pressure changes is far smaller than in the prior art approach as the pressure drop due to the single filling event is limited and the pump is able to replenish the mass into the chamber relatively fast. As a result the invention allows for a more stable operation of the pump (meaning less wear and noise), and for a more stable pressure of the mass (which may be advantageous for the properties thereof and of the formed food product, e.g. hamburger patty).

The invention claimed is:

1. A method for moulding food products from a pumpable foodstuff mass, wherein use is made of a moulding installation for moulding food products from a pumpable foodstuff mass, which installation comprises:
  a frame,
  an elongated mould drum having an outer circumferential drum surface and a longitudinal drum rotation axis, the drum being rotatably supported by the frame to revolve about the drum rotation axis,
  wherein the mould drum has in the drum surface multiple mould cavities, each having a fill opening for the introduction of foodstuff mass into the mould cavity,
  wherein the mould cavities are arranged in the drum surface in a mould cavities pattern with cavities at four or more longitudinal positions when seen in longitudinal direction of the drum and at multiple circumferential positions when seen in circumferential position of the drum, the drum not having rectilinear rows of mould cavities that are parallel to the drum rotation axis;

a mould drum drive coupled to the drum to drive the drum in a rotation direction, a mass feed member arranged at a fill position relative to the drum surface, said mass feed member having a single chamber with an inlet for foodstuff mass to introduce said foodstuff mass into the chamber and with a mouth facing said drum surface, said mouth being embodied as a closed contoured singular straight slot that is arranged parallel to the longitudinal axis of the drum and which is adapted to sequentially transfer mass into passing mould cavities of the rotating mould drum when the filling opening of one mould cavity only is in communication with the mouth at said fill position, said mass forming a food product in said mould cavity, a pump connected to the inlet of the mass feed member and adapted to feed foodstuff mass under pressure into the chamber of the mass feed member, wherein the method comprises:

driving the drum in said rotation direction in a continuous, non-interrupted manner;

operating the pump so as to feed foodstuff mass to the mass feed member and establish a foodstuff mass pressure in the chamber of said mass feed member, transfer of pressurized foodstuff mass via the mouth into each passing mould cavity in a corresponding mould cavity filling event that is defined by the moment of first flow of foodstuff mass into the mould cavity and the moment wherein the mould cavity has been fully filled and flow of foodstuff mass therein is terminated, release of moulded products from the mould cavities, and wherein the operation of the pump and the rotation of the mould drum are controlled in combination with the design of the mould cavities pattern on the drum and of the mouth of the mass feed member such that, in the method, all mould cavity filling events during a revolution of the mould drum are performed in sequential order such that only one mould cavity is filled at the time.

2. A method according to claim 1, wherein the operation of the pump and the rotation of the mould drum are controlled in combination with the design of the mould cavities pattern on the drum and of the mouth of the mass feed member such that in the method all mould cavity filling events during a revolution of the mould drum are performed in sequential order with a pause between each pair of successive filling events wherein effectively no flow of foodstuff mass out of the mouth takes place.

3. A method according to claim 1, wherein the installation comprises a foodstuff mass pressure sensor adapted to sense pressure of the foodstuff mass in the chamber of the mass feed member, and wherein the installation comprises a pump control unit connected to said foodstuff mass pressure sensor, wherein the method comprises selecting a target pressure or target pressure range for the foodstuff mass in the chamber, wherein the pump control unit stops or slows the pump when the measured foodstuff pressure exceeds said target pressure or said target pressure range and wherein the pump control unit activates or accelerates the pump when the measured foodstuff pressure drops below said target pressure or target pressure range.

4. A method according to claim 1, wherein the installation is provided with a pump timing mechanism that causes activation or acceleration of the pump during intervals that take place periodically during a revolution of the mould drum, each of said intervals being in timed relation to a corresponding filling event of a single mould cavity, an interval at least partly being in timed overlap with said single filling event, said activation or acceleration causing a temporary increase of flow of foodstuff mass to the mass feed member during said interval and said flow being relatively reduced in between successive intervals.

5. A method according to claim 1, wherein the mass feed member comprises a funnel body delimiting said chamber, said funnel body having main walls of substantially triangular shape connected along a mouth side thereof by a wall containing said mouth and with the inlet arranged at an apex of said main walls that is located opposite said wall containing said mouth, such that the effective cross section of the chamber increases from said inlet towards said wall containing said mouth.

6. A method according to claim 1, wherein the installation comprises a first and a second mass feed members that are arranged at a fill position, each mass feed chamber having a chamber that is separated from the chamber of the other mass feed member, and wherein the device has a single mould drum with a first section of the drum surface passing along the first mass feed member and a second section passing along the second mass feed member, the mould cavities of said single drum being filled by said first and second mass feed members, wherein each of the first section and the second section of the drum surface have multiple mould cavities that are arranged in a mould cavities pattern for each drum surface section with cavities at multiple longitudinal positions when seen in longitudinal direction of the drum and at multiple circumferential position when seen in circumferential position of the drum, and wherein for each mass feed member and corresponding drum surface section all filling events are performed in sequential order.

7. A method according to claim 1, wherein the mould cavity pattern is composed of mould cavities of identical dimensions.

8. A method according to claim 2, wherein the installation comprises a foodstuff mass pressure sensor adapted to sense pressure of the foodstuff mass in the chamber of the mass feed member, and wherein the installation comprises a pump control unit connected to said foodstuff mass pressure sensor, wherein the method comprises selecting a target pressure or target pressure range for the foodstuff mass in the chamber, wherein the pump control unit stops or slows the pump when the measured foodstuff pressure exceeds said target pressure or said target pressure range and wherein the pump control unit activates or accelerates the pump when the measured foodstuff pressure drops below said target pressure or target pressure range.

9. A method according to claim 2, wherein the installation is provided with a pump timing mechanism that causes activation or acceleration of the pump during intervals that take place periodically during a revolution of the mould drum, each of said intervals being in timed relation to a corresponding filling event of a single mould cavity, an interval at least partly being in timed overlap with said single filling event, said activation or acceleration causing a temporary increase of flow of foodstuff mass to the mass feed member during said interval and said flow being relatively reduced in between successive intervals.

10. A method for moulding food products from a pumpable foodstuff mass, wherein use is made of a moulding installation for moulding food products from a pumpable foodstuff mass, which installation comprises:

a frame, a mould drum having an outer circumferential drum surface and a longitudinal drum rotation axis, the drum being rotatably supported by the frame to revolve about the drum rotation axis, wherein the mould drum has in the drum surface multiple mould cavities, each having a fill opening for the introduction of foodstuff mass into the mould cavity, wherein the mould cavities are arranged in the drum surface in a mould cavities pattern with cavities at multiple longitudinal positions when seen in longitudinal direction of the drum and at multiple circumferential positions when seen in circumferential position of the drum, the drum having rectilinear rows of at least four mould cavities that are parallel to the drum rotation axis;

a mould drum drive coupled to the drum to drive the drum in a rotation direction, a mass feed member arranged at a fill position relative to the drum surface, said mass feed member having a single chamber with an inlet for foodstuff mass to introduce said foodstuff mass into the chamber and with a mouth facing said drum surface, said mouth being embodied as a closed contoured singular slot that is helically shaped so as to extend as a helix segment in longitudinal direction and circumferential direction relative to the mould drum and which is adapted to sequentially transfer mass into passing mould cavities of the rotating mould drum when the filling opening of one mould cavity only is in communication with the mouth at said fill position, said mass forming a food product in said mould cavity, a pump connected to the inlet of the mass feed member and adapted to feed foodstuff mass under pressure into the chamber of the mass feed member, wherein the method comprises:

driving the drum in said rotation direction in a continuous, non-interrupted manner;

operating the pump so as to feed foodstuff mass to the mass feed member and establish a foodstuff mass pressure in the chamber of said mass feed member, transfer of pressurized foodstuff mass via the mouth into each passing mould cavity in a corresponding mould cavity filling event that is defined by the moment of first flow of foodstuff mass into the mould cavity and the moment wherein the mould cavity has been fully filled and flow of foodstuff mass therein is terminated, release of moulded products from the mould cavities, and wherein the operation of the pump and the rotation of the mould drum are controlled in combination with the design of the mould cavities pattern on the drum and of the mouth of the mass feed member such that, in the method, all mould cavity filling events during a revolution of the mould drum are performed in sequential order, such that only one mould cavity is filled at a time.

* * * * *